(12) United States Patent
Basso et al.

(10) Patent No.: US 7,940,754 B2
(45) Date of Patent: *May 10, 2011

(54) MESSAGE FORMATION AND DISTRIBUTION IN HETEROGENEOUS NETWORKS

(75) Inventors: Claude Basso, Raleigh, NC (US); Philippe Damon, Raleigh, NC (US); Alain Albert Dorel, la Gaude (FR); Mathieu Michel Girard, Tourrettes sur Loup (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/048,528

(22) Filed: Mar. 14, 2008

(65) Prior Publication Data
US 2008/0163268 A1 Jul. 3, 2008

Related U.S. Application Data

(63) Continuation of application No. 10/387,847, filed on Mar. 13, 2003.

(51) Int. Cl.
*H04Q 11/00* (2006.01)
(52) U.S. Cl. .................. 370/386; 370/389; 719/328
(58) Field of Classification Search ................ None
See application file for complete search history.

(56) References Cited

U.S. PATENT DOCUMENTS

| | | | |
|---|---|---|---|
| 5,166,674 A | 11/1992 | Baum et al. | |
| 5,218,676 A | 6/1993 | Ben-Ayed et al. | |
| 5,586,116 A | 12/1996 | Hofestadt et al. | |
| 5,592,672 A | 1/1997 | Grewal et al. | |
| 5,754,786 A | 5/1998 | Diaz et al. | |
| 5,812,781 A | 9/1998 | Fahlman et al. | |
| 5,926,636 A | 7/1999 | Lam et al. | |
| 5,960,178 A | 9/1999 | Cochinwala et al. | |
| 5,974,414 A | 10/1999 | Stanczak et al. | |
| 6,088,749 A * | 7/2000 | Hebert et al. | 710/105 |
| 6,253,257 B1 * | 6/2001 | Dundon | 719/331 |
| 6,788,693 B1 | 9/2004 | Christie et al. | |
| 6,904,052 B1 | 6/2005 | Soubra et al. | |
| 7,007,100 B1 | 2/2006 | Doong et al. | |
| 7,009,323 B1 | 3/2006 | Simofi-Ilyes et al. | |
| 7,024,479 B2 | 4/2006 | Shah et al. | |
| 7,051,333 B1 | 5/2006 | Nylander et al. | |
| 7,095,747 B2 | 8/2006 | Sarmiento et al. | |
| 7,142,650 B1 | 11/2006 | Kult et al. | |
| 2002/0019887 A1 | 2/2002 | Moore | |
| 2002/0099827 A1 | 7/2002 | Shah et al. | |

OTHER PUBLICATIONS

USPTO Office Action for U.S. Appl. No. 10/387,847 dated Dec. 16, 2009. USPTO notice of allowance for U.S. Appl. No. 10/387,847 dated Jun. 28, 2010.

* cited by examiner

*Primary Examiner* — Kwang B Yao
*Assistant Examiner* — Salvador E Rivas
(74) *Attorney, Agent, or Firm* — Yee & Associates, P.C.; Jennifer R. Davis

(57) ABSTRACT

A system is disclosed for communicating with a plurality of network processors, one or more of the processors having a different operating environment, includes receiving an application programming interface (API) call from a user application, the API call including a call address identifying one or more of the network processors; and accessing a memory that identifies an appropriate form for the API call for each operating environment implemented by each network processor identified by the call address; and building one or more messages including the appropriate form for the API call for the operating environment of each of the network processors to receive any particular message.

11 Claims, 3 Drawing Sheets

MESSAGE FORMATION AND DISTRIBUTION IN HETEROGENEOUS NETWORKS

CROSS-REFERENCE TO RELATED APPLICATIONS

Under 35 USC §120, this application is a continuation application and claims the benefit of priority to U.S. patent application Ser. No. 10/387,847, filed Mar. 13, 2003 entitled "Method for Message Distribution to a Heterogeneous System", all of which is incorporated herein by reference.

FIELD OF THE INVENTION

The present invention relates generally to messaging in distributed network processing systems and more specifically to message distribution in heterogeneous distributed network processing systems.

BACKGROUND OF THE INVENTION

FIG. 1 is a schematic block diagram of a distributed network processing system 100. System 100 includes a control point (CP) 105 that is communicated to one or more network processors (NP) 110 by a switch 115. CP 105 communicates to the NPs 110 by use of messages sent through switch 115. Each message is marked with a destination address that is used by switch 115 to route the message. The destination address may be a unicast address or a multicast address. A unicast address identifies a single destination while a multicast address identifies one or more destinations. Switch 115 has a lookup table with an entry for each multicast address that indicates the members of the multicast set.

CP 105 includes a number of software components. There is a layer of software referred to as the Network Processor Application Services (NPAS) in CP 105 that provides services to User Applications to control NPs 110. An application programming interface (API) exists between the NPAS and the user application. The user application defines programming calls and returns that are used to communicate with the NPAS. A management application 120 learns about each NP 115 through the NPAS. For example, the hardware version and the software version of each NP 115 is provided to management application 120 by the NPAS. A user is thereby enabled to know which level of hardware and software exists for each NP 110.

The NPAS often is divided into multiple components, for example a first component 125, a second component 130 and a controller 135, with each of the components controlling a different NPAS function coordinated by control 135. For example, component 125 may control an internet protocol (IP) function and component 130 may control a multi-protocol layer switch (MPLS) function. The components are often independent but are able to share common utilities within the NPAS.

The components take requests from the user application, process those requests, build messages based upon the requests and issue the messages to the appropriate NP or NPs. The appropriate NPs are indicated by the application through use of an address parameter in an API call. The address in the address parameter is often the same address used by the switch to direct the messages to the appropriate NP or NPs as it may be a unicast or a multicast address.

FIG. 2 is a schematic process flow diagram for a processing operation 200 of the NPAS shown in FIG. 1. Processing operation 200 begins with an API call 205 from an application. Processing operation 200 first checks the call inputs for validity at step 210. After step 210, processing operation 200 processes the call inputs at step 215. This processing step 215 includes performing calculations or consulting internal data structures. Next at step 220, processing operation 200 builds an appropriate message according to the processing results. The appropriate message is then sent to the appropriate NPs in step 225 and control is returned to the application.

In a homogeneous network environment in which all the NPs all have the same or equivalent versions the processing operation of FIG. 2 operates satisfactorily. However, in a heterogeneous environment in which one or more NPs having a different or nonequivalent version are introduced into the network system a problem can arise. For purposes of this discussion, a different version of an NP is having a different hardware level or operating with a different software level as compared to a reference NP. An NP of a different version may require different messages or different message formats or have different functional capabilities as compared to the reference NP. For purposes of this discussion, an equivalent version for an NP as compared to a reference NP is one having a different version but the messages, the formats of these messages and the functional capabilities are the same for purposes of a particular API call or other relevant metric.

When the versions of the NPs are nonequivalent, the NPAS components need to perform different processing and send different messages and/or different message formats to various subsets of NPs as a result of a single API call. It is desirable to allow the processing overhead and burdens consequent to heterogeneous networks to be virtually transparent to any user application. What is needed is a solution that (a) reduces/minimizes an impact on current APIs, (b) reduces/minimizes an impact on NPAS components, (c) reduces/minimizes the number of messages sent through the switch, (d) the components should be independent of a coverage algorithm and (e) the NPAS components should not have to be aware of the many versions of hardware and/or software in the network system. Specifically, in (a), user applications may not be aware of the different versions of the NPs and it is preferable that a user application be able to operate in a heterogeneous system the same as it operates in a homogeneous network and to provide a single address (unicast or multicast) indicating the entire set of targeted NPs. In (b), it is not desirable to change the components in the NPAS when one or more NPs with a different version are introduced into a system. In (c), it is desirable to use multicast whenever possible to distribute the messages in order to minimize switch bandwidth usage. For (d), it is preferable that any algorithm used for determining the messaging subsets should be a common utility or function shared by all components. And (e), it would be advantageous that any additions of a new version NP not necessitate any change to any NPAS component.

Accordingly, what is needed is a method and system for providing transparent NP messaging in a heterogeneous network. The present invention addresses such a need.

SUMMARY OF THE INVENTION

A system and method is disclosed for communicating with a first network processor having a first operating environment and a second network processor having a second operating environment different from the first operating environment. The system includes a destination management service (DMS) including a memory, the memory registering (a) an application programming interface (API) call and recording an associated operating environment supporting the API call, (b) a messaging method appropriate for the API call in each operating environment; (c) a unicast address for each of the network processors and the operating environment for the network processor at each unicast address, and (d) a multicast address including the unicast addresses for the network processors; and a network processor application service, responsive to the API call from a user application identifying one or more network processors using a call address, the call address including the multicast address of one of the unicast addresses, for passing an identifier for the API call and the call address to the destination management service and for receiving a set of messaging methods for issuing the API call in appropriate form for the one or more operating environments implemented by the network processors addressed by the call address. The method for communicating with a plurality of network processors, one or more of the processors having a different operating environment, includes receiving an application programming interface (API) call from a user application, the API call including a call address identifying one or more of the network processors; and accessing a memory that identifies an appropriate form for the API call for each operating environment implemented by each network processor identified by the call address; and building one or more messages for the network processors identified by the call address, each of the one or more messages including the appropriate form for the API call for the operating environment of each of the network processors to receive any particular message.

The present invention permits transparent NP messaging in a heterogeneous network.

DETAILED DESCRIPTION

Figure 1:
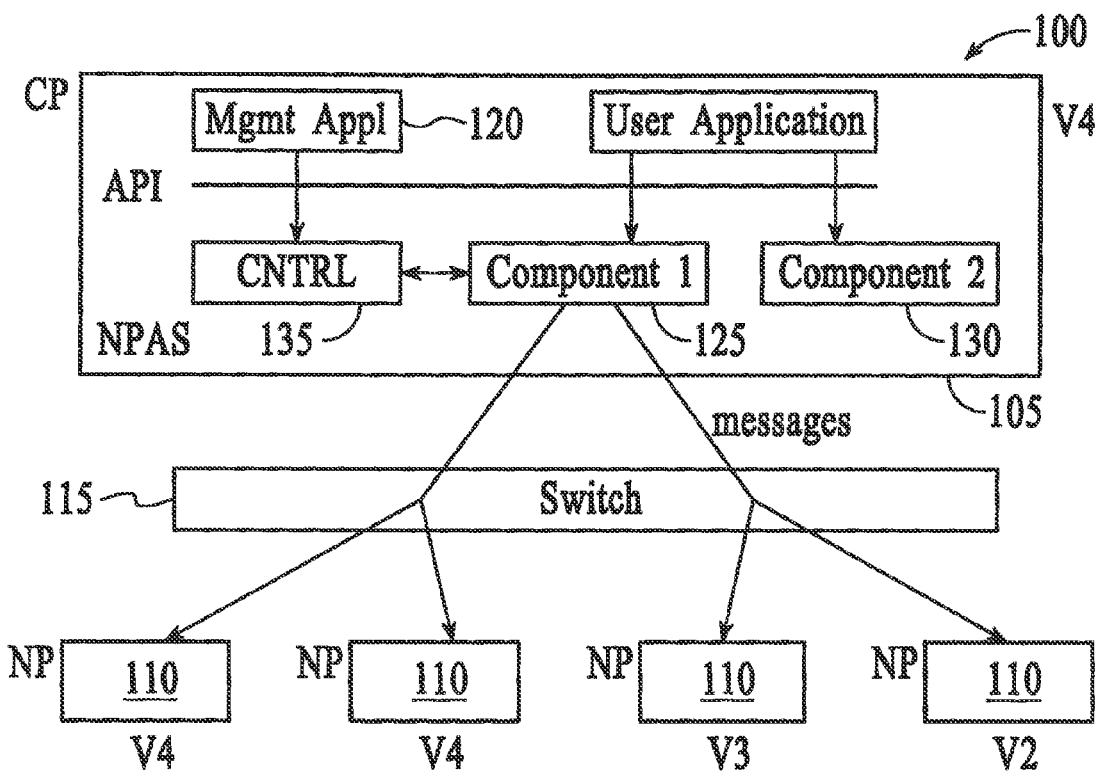
FIG. 1 is a schematic block diagram of a distributed network processing system.
Figure 3:
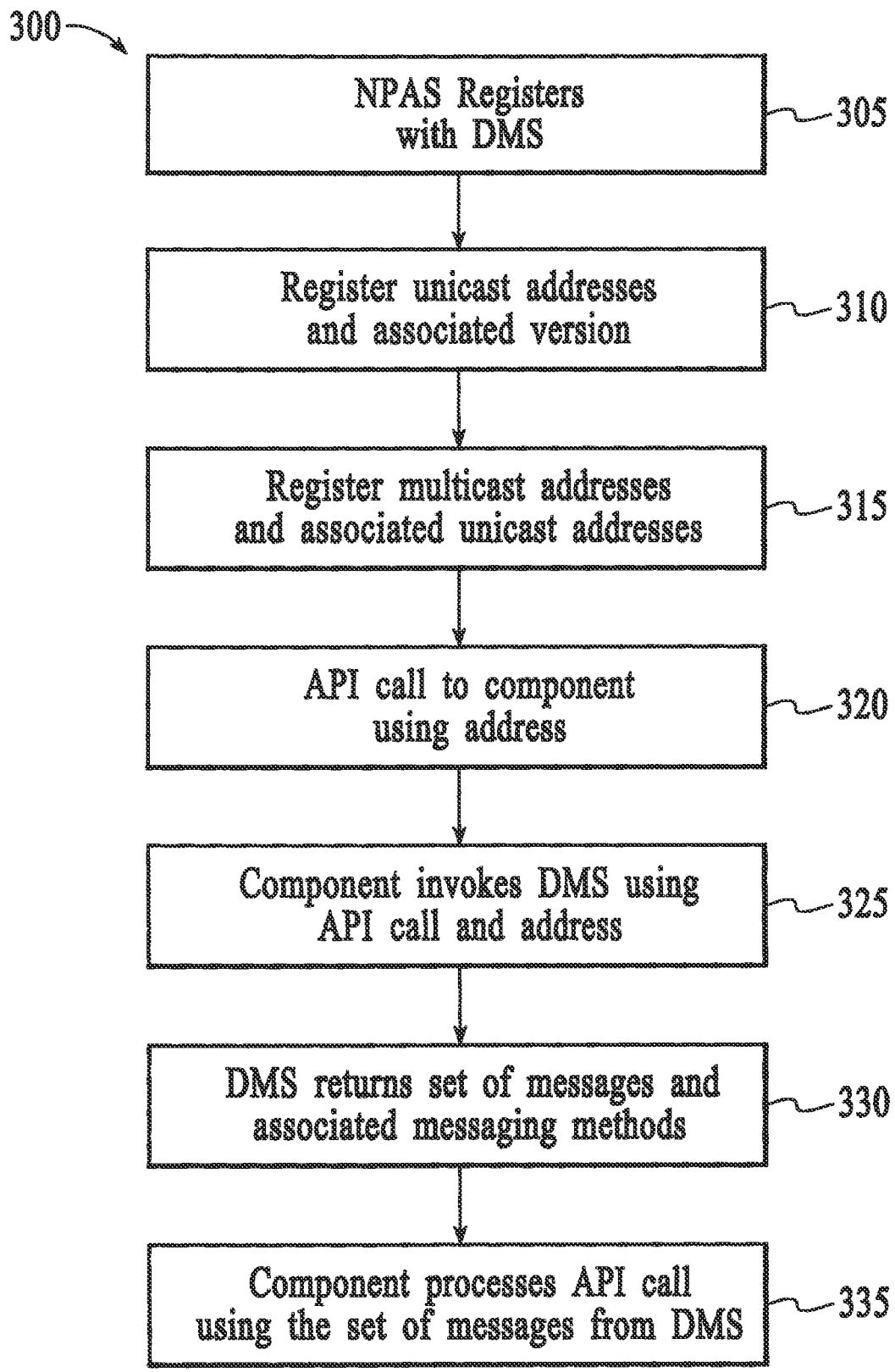
FIG. 3 is a flowchart of a preferred embodiment of the present invention for a message distribution process in a heterogeneous network.

FIG. 3 is a flowchart of a preferred embodiment of the present invention for a message distribution process 300 in a heterogeneous network. The preferred embodiment introduces a destination management service (DMS) into the NPAS in lieu of the previous control 135 shown in FIG. 1, as well as an architecture for components that are called messaging methods. In this new architecture, there are five entities including the user application, the NPAS component, a messaging entity, a transmission services and the new destination management service (DMS). The DMS tracks the various NP versions in a network system and determines a preferred set of messaging methods to be used for API call. The DMS interacts with the management component of the user application and the NPAS components in message distribution method 300 as shown in FIG. 3.

Process 300 performs a registration step 305 when the NPAS software is initialized. Each NPAS component registers with DMS. The NPAS component registers each API call within the component with the set of versions supported by the specific API call. Also indicated during the registration are the messaging methods required to process those versions. Versions are grouped as ranges so that all versions are not enumerated After registration step 305, message distribution process 300 performs another registration step 310. Registration step 310 is performed during application initialization in which the user management function registers with the DMS all the unicast addresses in the system giving the version number associated with the NP at that address.

After registration step 310, message distribution process 300 performs another registration step 315. Registration step 315 is also performed during application initialization in which the user management application registers with the DMS all the multicast addresses in the system and provides the unicast addresses that make up the multicast set.

Thereafter message distribution process 300, at API step 320, includes an NPAS component receiving a request from an application. This request is an API call and includes a unicast or multicast address as a parameter.

At invocation step 325 the NPAS component receiving the API call invokes the DMS by passing it the API call (or an identifier to the API call) and the destination address from the API call parameter.

In response to invocation step 325, message distribution process 300 executes DMS process 330. DMS process 330 computes a preferred/optimal set of messages that must be sent to achieve the result requested in the original API. DMS process 330 also associates the proper messaging method for each message in the message set and returns the message set and methods to the NPAS component that invoked the DMS. It is believed that there are different ways of computing the message set and associating the methods with the messages, each may be preferable in a various scenario or specific embodiment. The present invention contemplates that each of these ways may be used in the preferred embodiment. DMS process 330 does consider the various versions of the NPs included within the destination address when computing the message set and methods to return.

After DMS process step 330, message distribution process 300 processes the API call at step 335. The NPAS component that receives the message set and associated messages processes the API call by using the messages of the message set using the messaging methods prescribed by the DMS and sends the messages to the addresses (also identified by the DMS).

Figure 4:
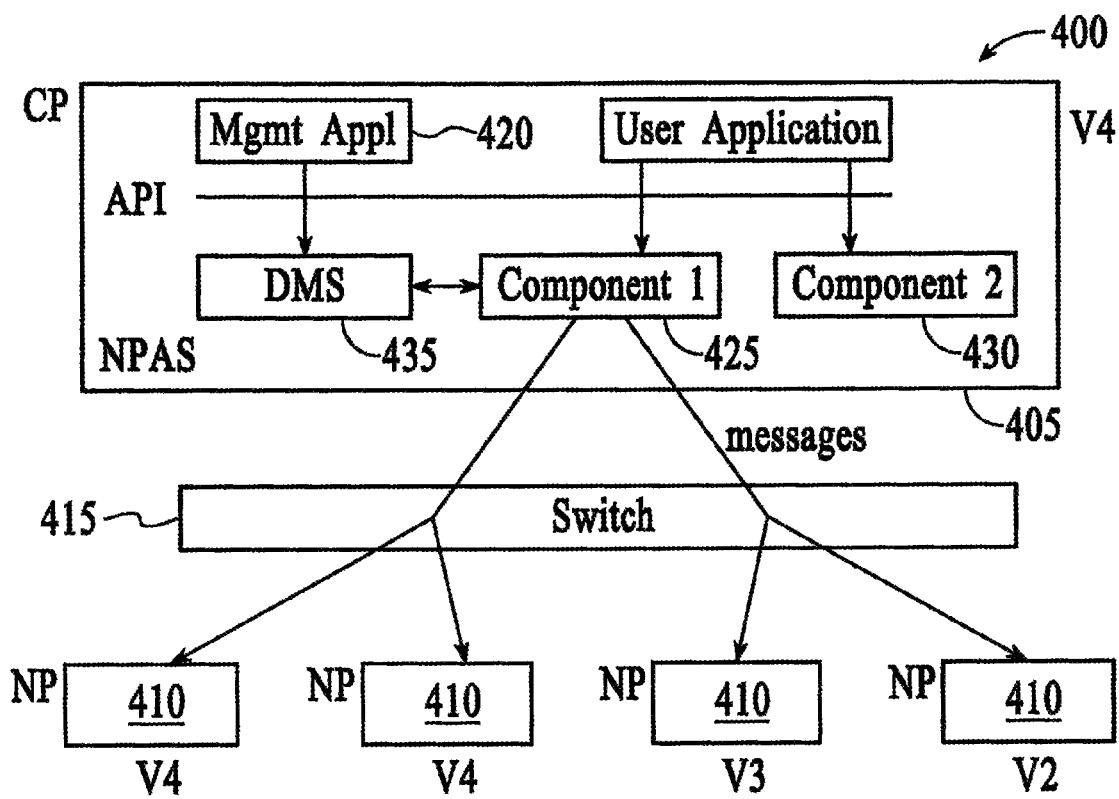
FIG. 4 is a schematic block diagram of a distributed network processing system.

FIG. 4 is a schematic block diagram of a distributed network processing system 400 according to the preferred embodiment. System 400 includes a control point (CP) 405 that is communicated to one or more network processors (NP) 410 by a switch 415. CP 405 communicates to the NPs 410 by use of messages sent through switch 415. Each message is marked with a destination address that is used by switch 415 to route the message. The destination address may be a unicast address or a multicast address. A unicast address identifies a single destination while a multicast address identifies one or more destinations. Switch 415 has a lookup table with an entry for each multicast address that indicates the members of the multicast set.

CP 405 includes a number of software components. There is a layer of software referred to as the Network Processor Application Services (NPAS) in CP 405 that provides services to User Applications to control NPs 415. An application programming interface (API) exists between the NPAS and the user application that defines programming calls and returns used to communicate with the NPAS. A management application 420 learns about each NP 415 through the NPAS.

For example, the hardware version and the software version of each NP 415 is provided to management application 420 by the NPAS. A user is thereby enabled to know which level of hardware and software exists for each NP 415.

The NPAS often is divided into multiple components, for example a first component 425, a second component 430 and a controller 435, with each of the components controlling a different NPAS function coordinated by destination management service (DMS) 435. For example, component 425 may control an internet protocol (IP) function and component 430 may control a multi-protocol layer switch (MPLS) function. The components are often independent but are able to share common utilities within the NPAS.

The components take requests from the user application, process those requests, build messages based upon the requests and issue the messages to the appropriate NP or NPs. The appropriate NPs are indicated by the application through use of an address parameter in an API call. The address in the address parameter is often the same address used by the switch to direct the messages to the appropriate NP or NPs as it may be a unicast or a multicast address.

Figure 2:
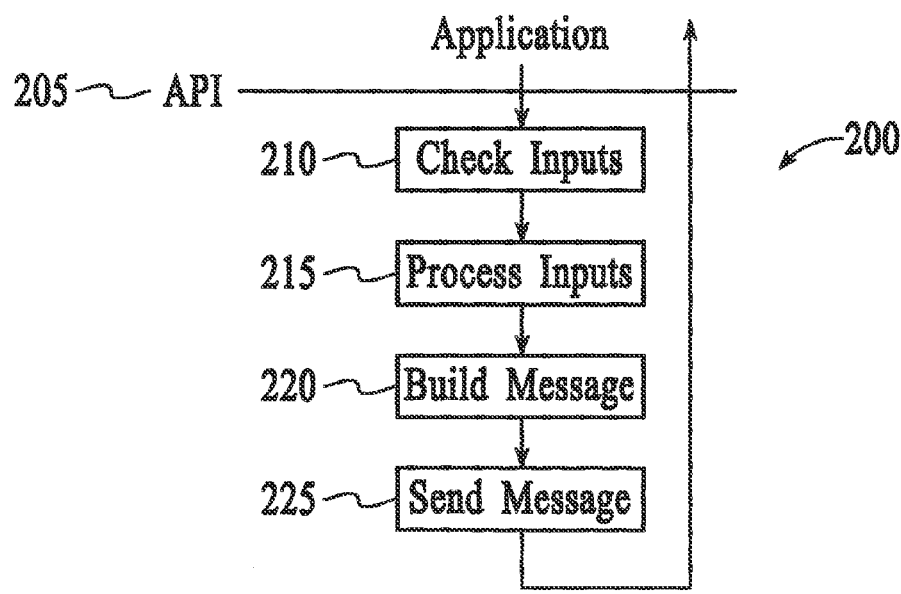
FIG. 2 is a schematic process flow diagram for a processing operation of the NPAS shown in FIG. 1.
Figure 5:
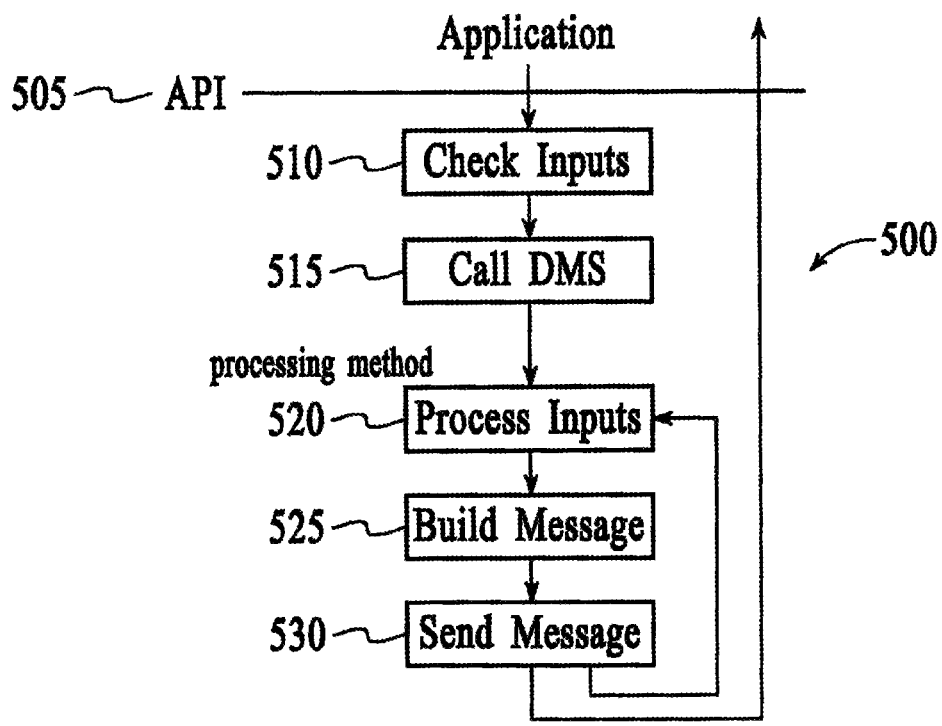
FIG. 5 is a schematic process flow diagram for a processing operation of an NPAS component shown in FIG. 4 including DMS message sets with associated messaging methodologies.

FIG. 5 is a schematic process flow diagram for a processing operation 500 of an NPAS component including DMS message sets with associated messaging methodologies. Processing operation 500 begins with an API call 505 from an application (like step 205 shown in FIG. 2). Processing operation 500 first checks the call inputs for validity at step 510. After step 510, processing operation 500 calls DMS at step 515. DMS returns the set of processing methods and processing operation 500 iteratively uses the processing methods as indicated by the DMS to process the inputs (step 520), to build the appropriate message (step 525) and to send the appropriate message (step 530). After sending a message, processing operation 500 returns to perform step 520 through step 530 for each processing method until all processing methods have been executed by processing, building and sending all messages to all the addressed NPs. Once all processing methods are executed, processing operation 500 returns control to the application issuing the API call.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A system for communicating with a first network processor having a first operating environment and a second network processor having a second operating environment different from the first operating environment, comprising:
   a destination management service (DMS) using a processor for registering an application programming interface (API) call, recording an associated operating environment supporting the API call, registering a unicast address for each of the network processors and the operating environment for the network processor at each unicast address, and registering a multicast address including the unicast addresses for the network processors; and
   a network processor application service, responsive to the API call identifying one or more network processors using a call address, for passing an identifier for the API call and the call address to the destination management service and for receiving a set of messaging methods from the DMS for issuing the API call in appropriate form for the network processors addressed by the call address.

2. The communicating system of claim 1 wherein the DMS includes a memory, the memory registering the API call, the unicast address and the multicast address.

3. The communicating system of claim 1 wherein the DMS registers the set of messaging methods.

4. The communicating system of claim 1 wherein the DMS registers the API call upon initialization of a management service coupled to the network processor application service.

5. The communicating system of claim 1 wherein the API call is received from a user application coupled to the network processor application service.

6. A computer readable storage device encoded with a computer program for communicating with a plurality of network processors, one or more of the processors having a different operating environment, the computer program comprising computer-executable instructions for:
   receiving an application programming interface (API) call, the API call including a call address identifying one or more of the network processors;
   accessing a service that identifies an appropriate form for the API call for each operating environment implemented by each network processor identified by the call address, wherein the service is a destination management service (DMS) for registering the application programming interface (API) call, recording an associated operating environment supporting the API call, registering a unicast address for each of the network processors and the operating environment for the network processor at each unicast address, and registering a multicast address including the unicast addresses for the network processors; and
   building one or more messages for the network processors identified by the call address, each of the one or more messages including the appropriate form for the API call for the operating environment of each of the network processors to receive any particular message.

7. A method for communicating with a first network processor having a first operating environment and a second network processor having a second operating environment different from the first operating environment, the method comprising:
   registering, by a destination management service (DMS), an application programming interface (API) call, a unicast address for each of the network processors and the operating environment for the network processor at each unicast address, and a multicast address including the unicast addresses for the network processors;
   recording, by the DMS, an associated operating environment supporting the API call; and
   responsive to the API call identifying one or more network processors using a call address, passing, by a network processor application service, an identifier for the API call and the call address to the destination management service and receiving, by the network processor application service, a set of messaging methods from the DMS for issuing the API call in appropriate form for the network processors addressed by the call address.

8. The method of claim 7, wherein the DMS includes a memory, the memory registering the API call, the unicast address and the multicast address.

9. The method of claim 7, wherein the DMS registers the set of messaging methods.

10. The method of claim 7, wherein the DMS registers the API call upon initialization of a management service coupled to the network processor application service.

11. The method of claim 7, wherein the API call is received from a user application coupled to the network processor application service.

* * * * *